(12) United States Patent
Ukai et al.

(10) Patent No.: US 10,990,917 B2
(45) Date of Patent: Apr. 27, 2021

(54) DATA ANALYSIS SYSTEM AND METHOD OF GENERATING ACTION

(71) Applicant: Hitachi, Ltd., Tokyo (JP)

(72) Inventors: Toshiyuki Ukai, Tokyo (JP); Yasuharu Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 196 days.

(21) Appl. No.: 16/124,561

(22) Filed: Sep. 7, 2018

(65) Prior Publication Data

US 2019/0122158 A1 Apr. 25, 2019

(30) Foreign Application Priority Data

Oct. 20, 2017 (JP) .............................. JP2017-203318

(51) Int. Cl.
*G06Q 10/06* (2012.01)
*G06Q 30/02* (2012.01)

(52) U.S. Cl.
CPC ... *G06Q 10/06393* (2013.01); *G06Q 30/0202* (2013.01)

(58) Field of Classification Search
CPC ..................... G06Q 10/06393; G06Q 30/0202
See application file for complete search history.

(56) References Cited

U.S. PATENT DOCUMENTS

| | | | | |
|---|---|---|---|---|
| 8,200,527 B1 * | 6/2012 | Thompson | ......... | G06Q 10/0639 705/7.39 |
| 8,214,238 B1 * | 7/2012 | Fairfield | .............. | G06Q 10/063 705/7.11 |
| 8,296,179 B1 * | 10/2012 | Rennison | ........... | G06Q 30/0251 705/14.53 |
| 2004/0015386 A1 * | 1/2004 | Abe | ................... | G06Q 30/0234 705/7.29 |
| 2008/0177621 A1 * | 7/2008 | Abe | ................... | G06Q 30/0244 705/7.25 |
| 2008/0178148 A1 * | 7/2008 | Enyeart | ............ | G06Q 10/06393 717/109 |
| 2014/0079297 A1 * | 3/2014 | Tadayon | ............ | G06K 9/00288 382/118 |

(Continued)

FOREIGN PATENT DOCUMENTS

JP 2014-081750 A 5/2014

OTHER PUBLICATIONS

Measuring service solution quality in services outsourcing projects using value driver tree approach R Akkiraju, R Zhou—2012 Annual SRII Global Conference, 2012—ieeexplore.ieee.org (Year: 2012).*

(Continued)

*Primary Examiner* — Jonathan G Sterrett
(74) *Attorney, Agent, or Firm* — Mattingly & Malur, PC

(57) ABSTRACT

A system, which is configured to generate an action for controlling a business to be carried out by a business operation system, the system is configured to: obtain business data including a plurality of attributes relating to the business from the business operation system; identify target data to be analyzed based on a distribution of a relevant indicator; analyze the target data, to thereby calculate an awareness feature, which is likely to contribute to improvement of the business evaluation indicator; generate an action for improving the business evaluation indicator based on the awareness feature.

10 Claims, 8 Drawing Sheets

(56) References Cited

U.S. PATENT DOCUMENTS

2014/0108100 A1    4/2014  Moriwaki et al.
2016/0342911 A1*  11/2016  Kannan .................. G06Q 30/01
2017/0220943 A1*   8/2017  Duncan .................... G06F 8/38

OTHER PUBLICATIONS

Recommender systems in commercial use SE Aldrich—AI Magazine, 2011—aaai.org (Year: 2011).*

* cited by examiner

FIG. 6A

| CUSTOMER ID 601 | AGE GROUP 602 | GENDER 603 | AGGREGATION PERIOD 604 | PURCHASED ARTICLE 605 | PURCHASE AMOUNT 606 | USE OF COUPON 607 | 600-1 |
|---|---|---|---|---|---|---|---|
| 0001 | 30s | MALE | APRIL | FOODS | 4000 | COUPON FOR 5% DISCOUNT | |
| 0002 | 30s | MALE | APRIL | SUNDRIES | 3000 | NO | |
| 0003 | 20s | MALE | APRIL | FOODS | 500 | NO | |
| 0004 | 40s | FEMALE | APRIL | SUNDRIES | 300 | NO | |
| ... | ... | ... | ... | ... | ... | ... | |

FIG. 6B

| CUSTOMER ID 601 | AGE GROUP 602 | GENDER 603 | AGGREGATION PERIOD 604 | PURCHASED ARTICLE 605 | PURCHASE AMOUNT 606 | USE OF COUPON 607 |
|---|---|---|---|---|---|---|
| 0001 | 30s | MALE | MAY | FOODS | 4000 | COUPON FOR 5% DISCOUNT |
| 0002 | 30s | MALE | MAY | FOODS | 3700 | NO |
| 0003 | 20s | MALE | MAY | FOODS | 1000 | COUPON FOR 5% DISCOUNT |
| 0004 | 40s | FEMALE | MAY | SUNDRIES | 300 | NO |
| ... | ... | ... | ... | ... | ... | ... |

600-2

| 701 | 702 | 703 | 704 | 705 700 |
|---|---|---|---|---|
| OPERATION ID | ASSIGNED ORDER | OPERATION SUBJECT | OPERATION START TIME POINT | OPERATION PERIOD |
| 0001 | 1 | ARTICLE_A | 9:00 | 8 MINUTES |
| 0002 | 2 | ARTICLE_B | 9:08 | 3 MINUTES |
| 0003 | 3 | ARTICLE_A | 9:11 | 1 MINUTE |
| 0004 | 4 | ARTICLE_C | 9:12 | 11 MINUTES |
| 0005 | 5 | ARTICLE_C | 9:23 | 3 MINUTES |
| 0006 | 6 | ARTICLE_A | 9:26 | 6 MINUTES |
| 0007 | 7 | ARTICLE_A | 9:32 | 4 MINUTES |

*FIG. 7*

| 801 | 802 | 803 | 804 | 805 800 |
|---|---|---|---|---|
| OPERATION ID | ASSIGNED ORDER | OPERATION SUBJECT | OPERATION START TIME POINT | SEQUENCE |
| 0001 | 1 | ARTICLE_A | 9:00 | BA |
| 0002 | 2 | ARTICLE_B | 9:08 | ABA |
| 0003 | 3 | ARTICLE_A | 9:11 | BAC |
| 0004 | 4 | ARTICLE_C | 9:12 | ACC |
| 0005 | 5 | ARTICLE_C | 9:23 | CCA |
| 0006 | 6 | ARTICLE_A | 9:26 | CAA |
| 0007 | 7 | ARTICLE_A | 9:32 | AA |

*FIG. 8*

DATA ANALYSIS SYSTEM AND METHOD OF GENERATING ACTION

CLAIM OF PRIORITY

The present application claims priority from Japanese patent application JP 2017-203318 filed on Oct. 20, 2017, the content of which is hereby incorporated by reference into this application.

BACKGROUND OF THE INVENTION

This invention relates to a system and method for generating an action.

In recent years, big data analysis has been widely used in various fields. For example, a method of using data accumulated in a business operation system operated in the retail industry, the distribution industry, and the like to extract valuable know-how for increasing performance is attracting attention.

For example, in JP 2014-81750 A, there is described a technology involving "defining three operators indicating a condition, a subject, and an arithmetic operation, which are variable generation conditions, in advance for data that is input to an analysis system, and using those operators to automatically generate a large number of explanatory variables". Factors hidden in a large amount of data and affecting the performance can be identified through use of the technology described in JP 2014-81750 A.

SUMMARY OF THE INVENTION

In the technology described in JP 2014-81750 A, the factors affecting the performance are identified based on the explanatory variables closely correlating with a response variable such as the performance and an indicator for evaluating the performance, to thereby support introduction of an action for increasing the performance.

The action generated or proposed based on the explanatory variables closely correlating with the response variable is considered to be effective for improving performance of the business. However, the explanatory variables closely correlating with the response variable are not always only the factors that affect the performance. Therefore, an action for increasing the performance from a new point of view cannot be generated with the above-mentioned technology.

This invention has an object to automatically and efficiently generate an action for improving performance of a business from a new point of view.

According to a representative example of this invention disclosed in the subject application, there is provided a data analysis system, which is configured to generate an action for controlling a business to be carried out by a business operation system, the business operation system including at least one computer including: an arithmetic device; a storage device coupled to the arithmetic device; and an interface, which is coupled to the arithmetic device, and is to be use for communication to and from the business operation system. The arithmetic device is configured to: obtain business data including a plurality of attributes relating to the business from the business operation system via the interface; identify target data to be analyzed based on a distribution of a relevant indicator, which is one of: a value of one of the plurality of attributes; and a value calculated based on the value of the one of the plurality of attributes, and relates to a business evaluation indicator to be used to evaluate the business; analyze the target data, to thereby calculate an awareness feature, which is likely to contribute to improvement of the business evaluation indicator; generate an action for improving the business evaluation indicator based on the awareness feature; and output data on the generated action via the interface.

According to one embodiment of this invention, it is possible to automatically and efficiently generate an action for improving performance of the business. Problems, configurations, and effects other than those described above become apparent from the following description of embodiments of this invention.

BRIEF DESCRIPTION OF THE DRAWINGS

The present invention can be appreciated by the description which follows in conjunction with the following figures, wherein:

FIG. 6A and FIG. 6B are tables for showing an example of a data structure of data generated through conversion of business data by a data analysis system according to the second embodiment;

FIG. 7 is a table for showing an example of the data structure of the data generated through the conversion of the business data by a data analysis system according to a third embodiment of this invention; and FIG. 8 is a table for showing an example of the data structure of the data generated through the conversion of the business data by a data analysis system according to a modification example of the third embodiment.

DETAILED DESCRIPTION OF THE PREFERRED EMBODIMENTS

Figure 1:
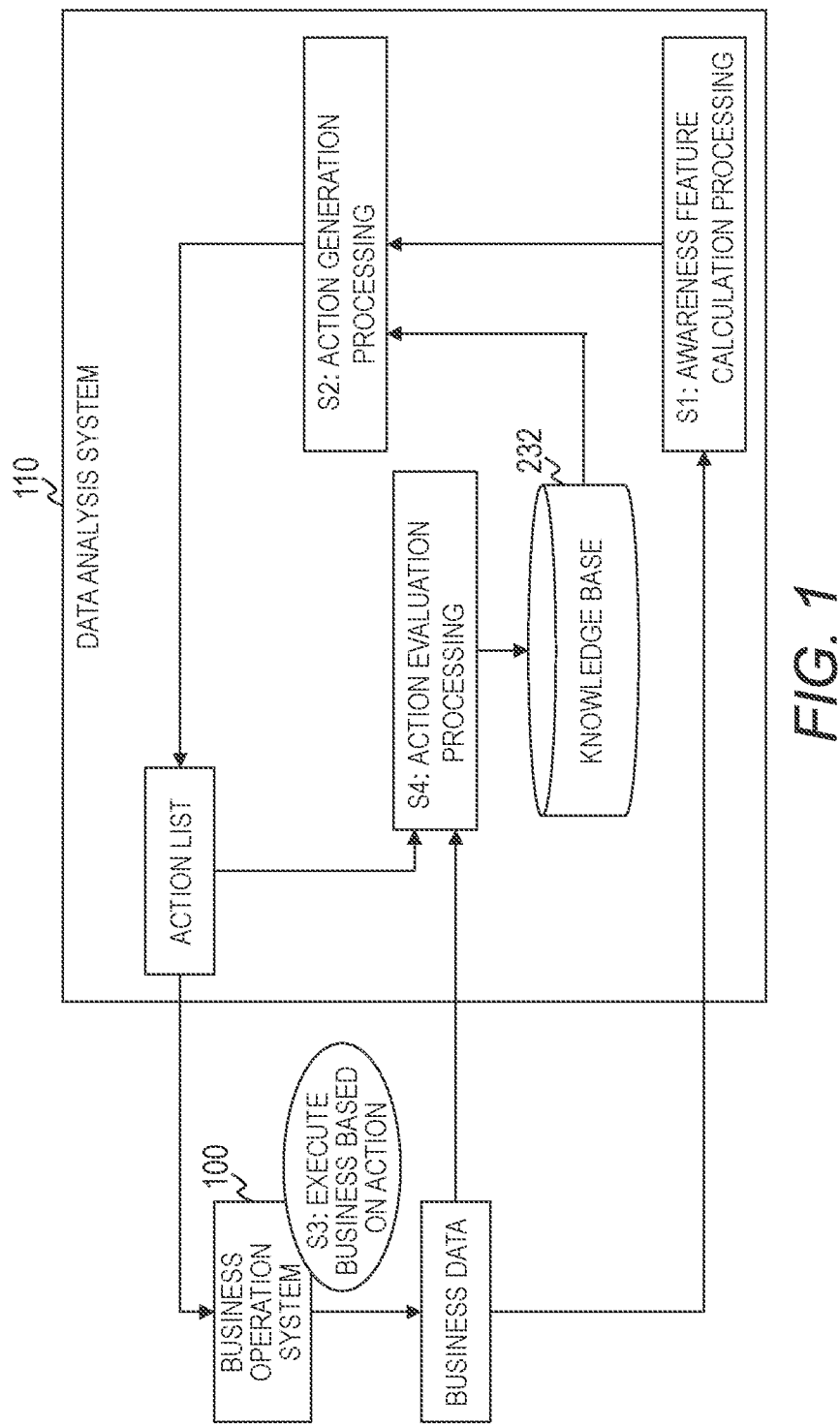
FIG. 1 is a diagram for illustrating an example of components of a system in a first embodiment of this invention.

A description is now given of embodiments of this invention with reference to the accompanying drawings. In the drawings, common components are denoted by the same reference numeral.

First Embodiment

In a first embodiment of this invention, a description is given of an overview of this invention. FIG. 1 is an explanatory diagram for illustrating an example of components of a system in the first embodiment.

The system includes a business operation system 100 and a data analysis system 110. The business operation system 100 and the data analysis system 110 are coupled to each other directly or via a network.

The business operation system 100 is a system configured to carry out predetermined businesses. The business operation system 100 includes at least one computer. The data analysis system 110 is configured to acquire business data including business details, business results, and the like from the business operation system 100, and then generate an action for achieving a change in business evaluation indicator indicating an improvement in performance of the business. The business evaluation indicator is an indicator for evaluating the business, for example, a key performance indicator (KPI).

The business data includes a plurality of attributes, which are parameters relating to the business. The attributes are, for example, a timestamp, a gender, an amount of money, and a processing period.

In the system in the first embodiment, the business operation system 100 and the data analysis system 110 operate in a cycle described now.

The data analysis system 110 carries out awareness feature calculation processing for calculating awareness features to be used to generate actions based on the business data acquired from the business operation system 100 (Step S1).

The awareness feature is value data, a variable, a function, and a combination thereof that are likely to affect the improvement in performance of the business. More specifically, the awareness feature is value data, a variable, a function, and a combination thereof that are likely to contribute to an improvement in the business evaluation indicator. In this case, the improvement in the business evaluation indicator means, for example, causing the business evaluation indicator to approach a target value, or maximization or minimization of the business evaluation indicator.

For example, in a case of the business operation system 100 for selling articles, an attribute value group for identifying users who buy articles and the articles is calculated as an awareness feature. Moreover, in a case of the business operation system 100 for carrying out an operation in accordance with a schedule, a combination of operations is calculated as an awareness feature.

The data analysis system 110 carries out action generation processing for generating actions for improving the business evaluation indicator based on the calculated awareness features (Step S2).

In the action generation processing, the data analysis system 110 generates an action by, for example, changing at least one of the attribute values of the attribute value group calculated as the awareness feature. Data on the generated actions is registered in an action list.

The data analysis system 110 transmits the action list to the business operation system 100, and instructs the business operation system 100 to execute the actions registered in the action list. The data analysis system 110 may transmit the action list to an output device, for example, a display, to thereby present the action list to an administrator of the data analysis system 110 or the business operation system 100. For example, through the presentation of the action list, the administrator can select actions to be applied.

The business operation system 100 carries out the business based on the actions registered in the action list (Step S3). The business operation system 100 transmits the business data to the data analysis system 110.

The data analysis system 110 carries out action evaluation processing for evaluating the actions based on the action list and the business data (Step S4).

In the action evaluation processing, the data analysis system 110 determines whether or not the business evaluation indicator has been improved as a result of the execution of the business based on the generated actions. Moreover, the data analysis system 110 registers the actions and evaluation results of the actions in a knowledge base 232.

In this system, the cycle of the processing of from Step S1 to Step S4 is repeated. Through this cycle, information on the actions effective for improving performance of the business is accumulated in the knowledge base 232 automatically and efficiently. Moreover, performance of the business of the business operation system 100 is automatically improved.

Figure 2:
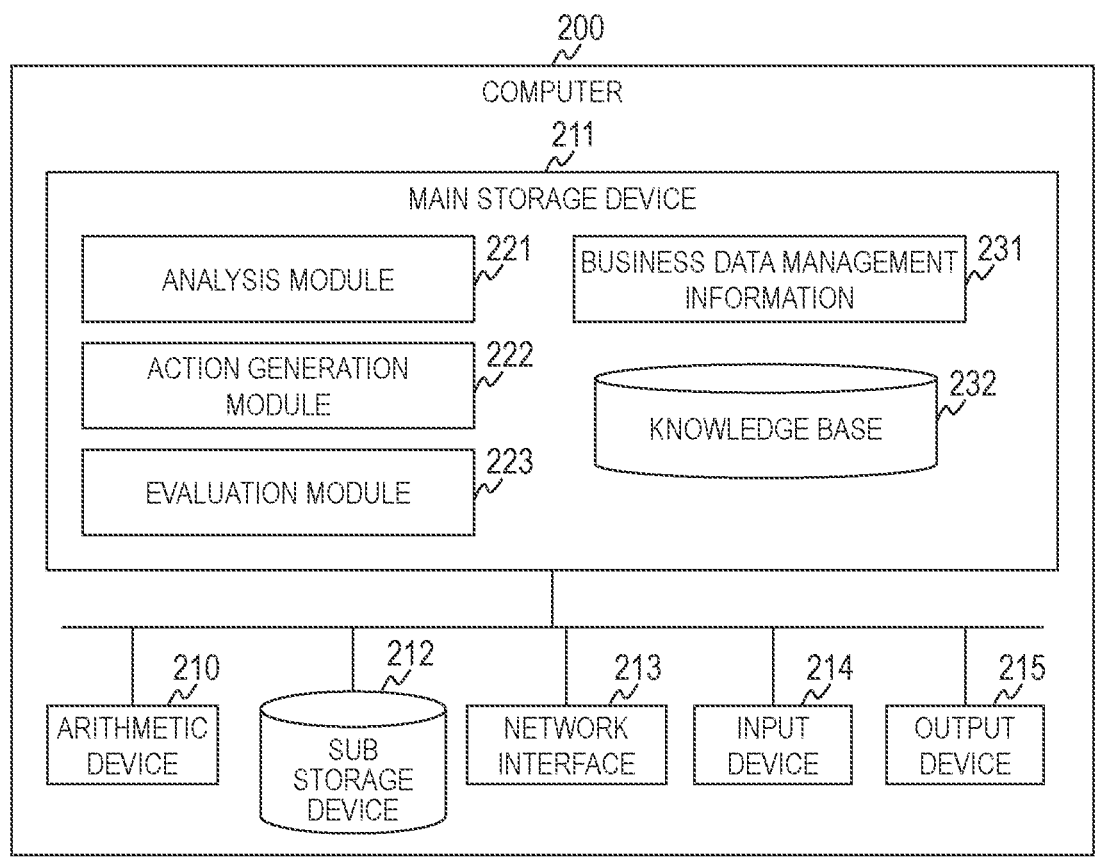
FIG. 2 is a diagram for illustrating an example of hardware components and software components of a computer included in a data analysis system according to the first embodiment.

A description is now given of components of a computer 200 included in the data analysis system 110. FIG. 2 is a diagram for illustrating an example of hardware components and software components of the computer 200 included in the data analysis system 110 according to the first embodiment.

The computer 200 has an arithmetic device 210, a main storage device 211, a sub storage device 212, a network interface 213, an input device 214, and an output device 215 as the hardware components. Those hardware components are coupled to one another via an internal bus.

The arithmetic device 210 is a processor, a graphics processing unit (GPU), a field programmable gate array (FPGA), and the like, and executes programs stored in the main storage device 211.

The arithmetic device 210 carries out processing in accordance with the program to function as a module (functional module) configured to implement a specific function. In the following, when processing is described with the module serving as a subject of a sentence, the description indicates a state in which the arithmetic device 210 is executing a program for implementing the module.

The main storage device 211 is a memory, for example, a dynamic random access memory (DRAM), and stores a program to be executed by the arithmetic device 210 and information to be used by the program. The main storage device 211 may be constructed of a volatile memory device, or may be constructed of a nonvolatile memory device. The program and information stored in the main storage device 211 are described later.

The sub storage device 212 is a hard disk drive (HDD), a solid state drive (SSD), or the like, and permanently stores data. The program and information stored in the main storage device 211 may be stored in the sub storage device 212. In this case, the arithmetic device 210 reads out the program and information from the sub storage device 212, loads the program and information onto the main storage device 211, and executes the loaded program.

The network interface 213 communicates to/from an external apparatus via the network.

The input device 214 is a device configured to receive input of data, such as a keyboard, a mouse, or a touch panel.

The output device 215 is a device configured to output or display data, such as a touch panel or a display.

The computer 200 may not have the sub storage device 212, the input device 214, and the output device 215.

A description is now given of the program and information stored in the main storage device 211. The main storage device 211 stores programs for implementing an analysis module 221, an action generation module 222, and an evaluation module 223. Moreover, the main storage device 211 stores business data management information 231 and the knowledge base 232.

The business data management information 231 is information for managing a history of the business data acquired from the business operation system 100.

The knowledge base 232 is information for managing data on the actions. Data on all the generated actions or only data on actions that have been confirmed to improve the business may be stored in the knowledge base 232.

The analysis module 221 is configured to identify target data to be analyzed based on a distribution of a value (relevant indicator) relating to the business evaluation indicator. Further, the analysis module 221 is configured to analyze the target data, to thereby calculate the awareness features.

The action generation module 222 is configured to generate actions based on the awareness features calculated by the analysis module 221.

The evaluation module 223 is configured to use the actions generated by the action generation module 222 and the business data acquired from the business operation system 100 after the business based on those actions has been carried out, to thereby evaluate effectiveness of the generated actions.

Regarding the modules of the computer 200, a plurality of modules may be combined into one module, or one module may be divided into a plurality of modules responsible for different functions.

Figure 3:
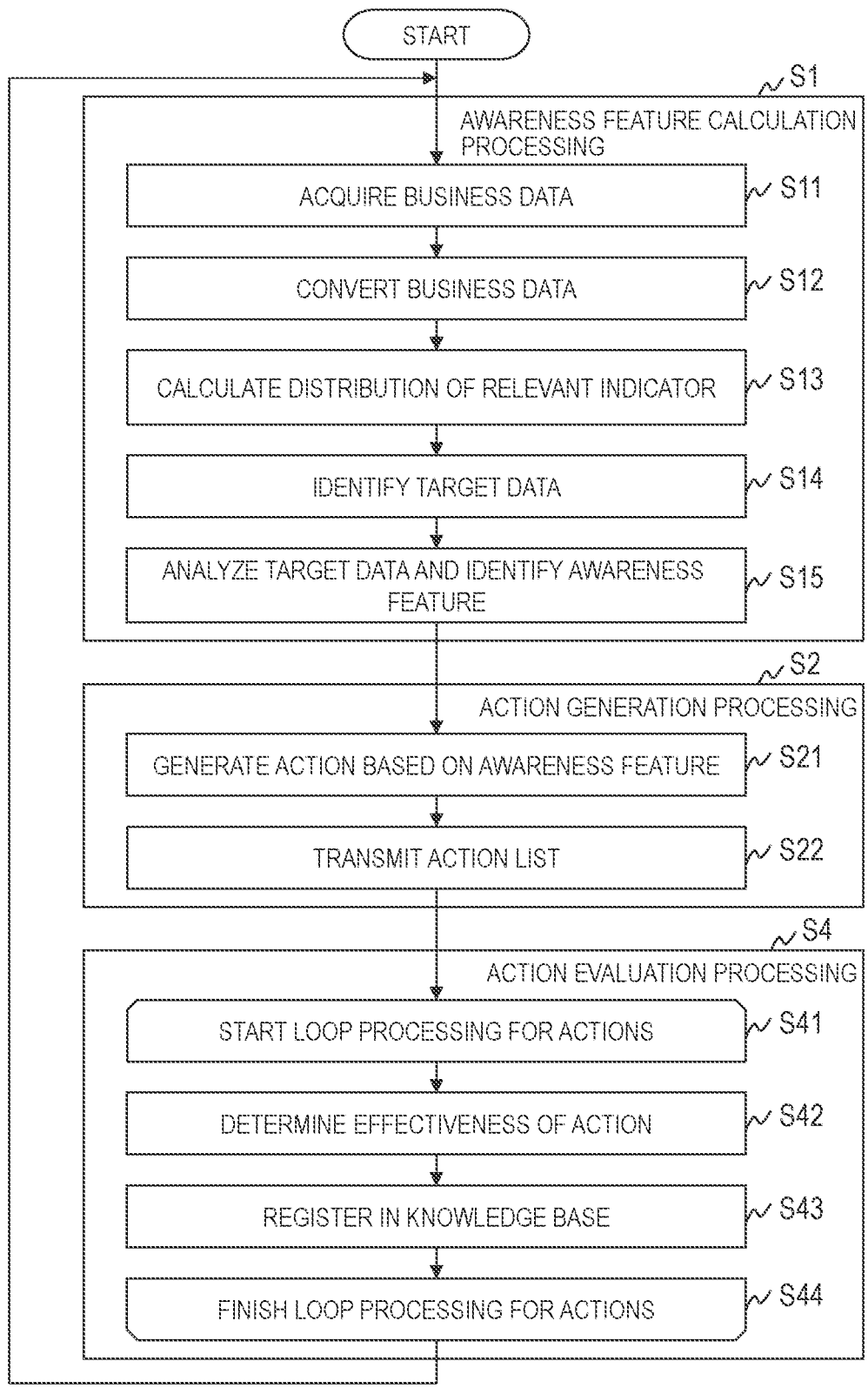
FIG. 3 is a flowchart for illustrating processing to be carried out by the data analysis system according to the first embodiment.

A description is now given of details of processing to be carried out by the computer 200. FIG. 3 is a flowchart for illustrating processing to be carried out by the data analysis system 110 according to the first embodiment.

First, a description is given of awareness feature calculation processing.

The analysis module 221 acquires the business data stored in the business data management information 231 or the business data from the business operation system 100 (Step S11), and converts the business data to predetermined data (Step S12). For example, in accordance with predetermined criteria, the analysis module 221 aggregates the business data, and complements deficit values, deletes abnormal values, and corrects inconsistency of data representations.

The analysis module 221 uses the converted data to calculate the distribution of the relevant indicator (Step S13). For example, the analysis module 221 calculates a distribution of a purchase price for each user who buys articles, a distribution of an operation period, and the like.

The analysis module 221 identifies target data based on the calculated distribution (Step S14). The target data may be the business data itself, or may be data calculated or generated through use of a plurality of pieces of business data.

The analysis module 221 analyzes the target data, to thereby calculate at least one awareness feature (Step S15). The analysis module 221 outputs a list of the awareness features to the action generation module 222.

In the related art, explanatory variables being causes of a response variable are identified based on correlations obtained from a result of analysis of all business data. When such explanatory variables are used, an action for achieving a business enhancing the correlation can be generated, but an action for achieving a business of solving a factor that cannot be found from the correlation cannot be generated. In other words, an action based on a point of view different from the correlation cannot be generated.

In contrast, the analysis module 221 in the first embodiment selects a singular portion of the relevant indicator, for example, data locally distributed on one end of a normal distribution, as target data based on the distribution of the relevant indicator. This data is likely to include a factor that may greatly change the business evaluation indicator, and is thus selected. The analysis module 221 analyzes the target data, to thereby be able to calculate a factor that cannot be found only from the correlation analysis, namely, the awareness feature, which is likely to contribute to the improvement of the business evaluation indicator.

A description is now given of the action generation processing.

The action generation module 222 generates actions based on the list of the awareness features (Step S21). The action to be generated is data on a subject of the action, information on an action to be applied to the subject, a date and time of transmission of the data on the action, and the like. The subject of the action is divided into two groups for an A/B testing, and each subject is assigned a flag indicating the associated group. The action generation module 222 registers data on at least one generated action in the action list.

The action generation module 222 transmits the action list including the data on at least one generated actions to the business operation system 100 (Step S22).

The action generation module 222 may select and adjust the actions included in the action list based on the knowledge base 232 or user's input.

For example, the action generation module 222 refers to the knowledge base 232 to determine whether or not an action having the same details as those of the generated action exists. In a case where an action having the same details as those of the generated action exists in the knowledge base 232, the action generation module 222 determines whether or not an effect 504 of this action is "ineffective". In a case where the effect 504 of the action is determined to be "ineffective", the action generation module 222 deletes the generated action from the action list.

Moreover, as another method, in a case where data on an action whose effect 504 is "effective" is not included in the action list, the action generation module 222 registers the data on this action in the action list.

In a case where the business operation system 100 receives the action list, the business operation system 100 controls a business to be carried out based on the actions. Moreover, the business operation system 100 transmits the business data to the data analysis system 110.

The business operation system 100 carries out a business to which control based on an action is to be applied and the business to which the control based on the action is not to be applied in accordance with the A/B testing or the like in order to determine the effectiveness of the action.

A description is now given of the action evaluation processing.

The evaluation module 223 starts loop processing for the actions (Step S41). Specifically, the evaluation module 223 selects an action to be evaluated from the actions registered in the action list.

The evaluation module 223 uses the business data acquired from the business operation system 100 after a business based on the selected action is carried out to evaluate the effectiveness of the selected action (Step S42). For example, the effectiveness of the action is evaluated through comparison of the two groups with each other based on the flag of the A/B testing assigned in Step S21. In this case, the evaluation module 223 may convert the business data as in Step S12, and may use the converted data to evaluate the effectiveness of the action.

The evaluation module 223 registers data on the action and a determination result of the effectiveness of the action in the knowledge base 232 (Step S43).

The evaluation module 223 determines whether or not all the actions registered in the action list have been evaluated (Step S44).

In a case where all the actions registered in the action list are determined not to have been evaluated, the evaluation module 223 returns to Step S41, and carries out the same processing.

In a case where all the actions registered in the action list are determined to have been evaluated, the evaluation module 223 returns to Step S1, and carries out the same processing.

Figure 4:
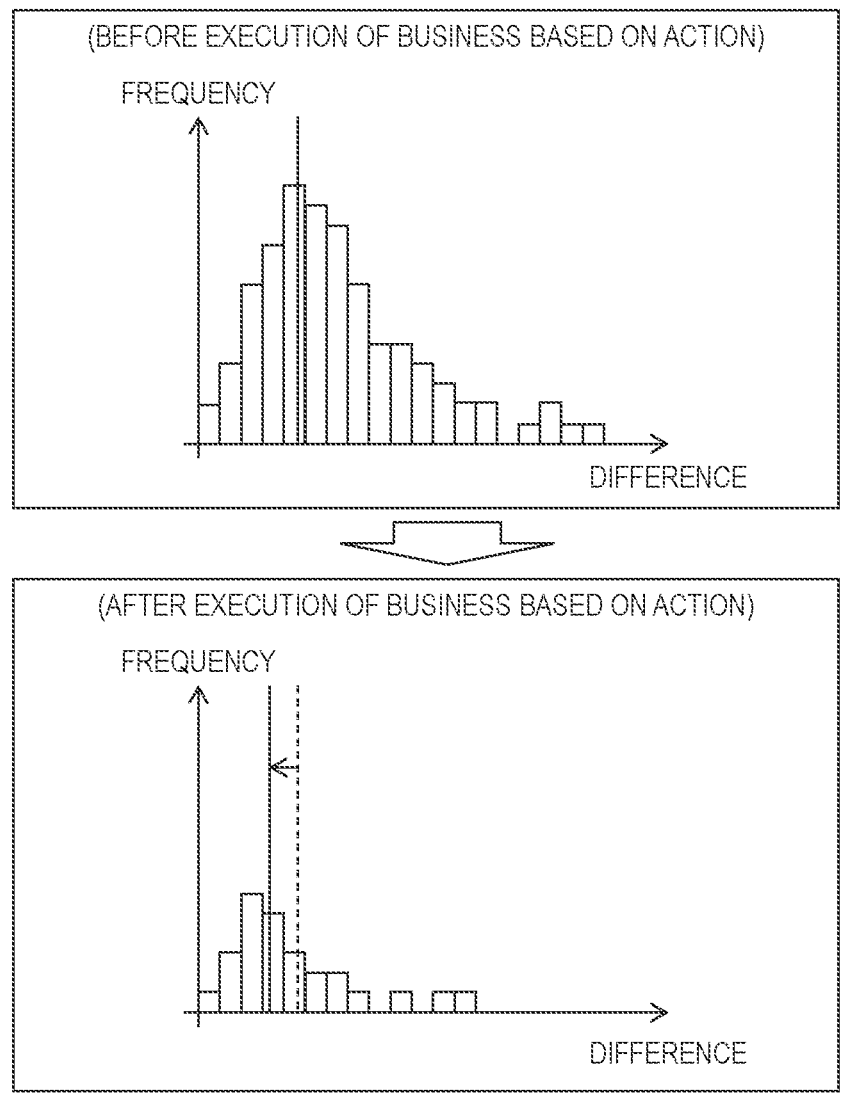
FIG. 4 is a graph for showing an example of an improvement in performance of a business of a business operation system in the first embodiment.

FIG. 4 is a graph for showing an example of an improvement in performance of a business of the business operation system 100 in the first embodiment.

In this case, the business operation system 100 configured to manage a distribution business is considered. The horizontal axis indicates a difference (time width) between a transport time point set by a scheduler and an actual transport time point. The vertical axis indicates the number of pieces of business data corresponding to each of the time widths. In this case, a sum of the time widths can be used as the business evaluation indicator. Thus, it is considered that as the sum of the time widths is reduced, performance of the business is improved more.

Pieces of business data corresponding to the respective time widths are dispersed as shown in the distribution of FIG. 4. The data analysis system 110 identifies business data having narrow time widths as target data, and carries out analysis focusing on the target data, to thereby calculate an awareness feature. Further, the data analysis system 110 generates an action based on the awareness feature.

In a case where the distribution of the relevant indicator has changed as shown in FIG. 4 as a result of the execution of the business based on the action, the sum of the time widths is reduced, which indicates an improvement in performance of the business.

According to the first embodiment, the factor that cannot be found only from the correlation analysis, namely, the awareness feature, can be calculated by identifying the target data to be analyzed from the distribution of the relevant indicator, and analyzing the identified target data.

Moreover, the relevant indicator often exhibits dispersion also after a business based on an action, which is generated based on a certain awareness feature, is carried out. Thus, an action can be generated based on a new factor (awareness feature) through the same processing. Thus, a beneficial action, namely, know-how on a business, can automatically and efficiently be obtained while the business operation system 100 is being operated, and can be accumulated as the cycle is repeated, to thereby achieve an improvement in performance of the business.

A description is now given of specific application examples of the system in the first embodiment by using second to fourth embodiments of this invention.

Second Embodiment

In the second embodiment, a description is given of specific data processing while the business operation system 100 configured to carry out sales of articles is exemplified. It is assumed that total sales in one month are set as the business evaluation indicator.

Figure 5:
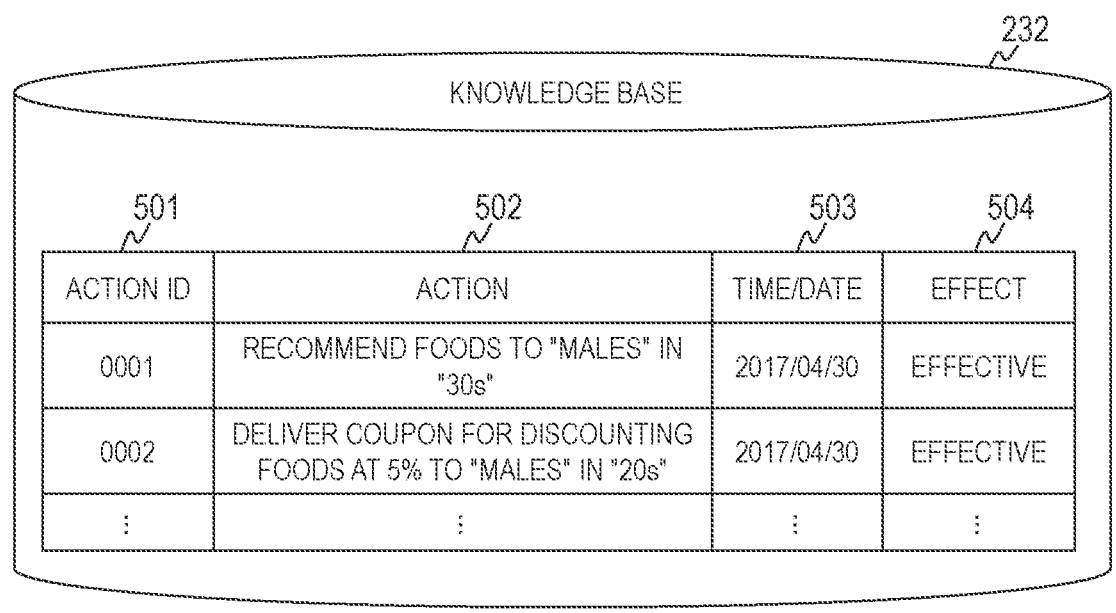
FIG. 5 is a table for showing an example of a data structure of a knowledge base in a second embodiment of this invention.

FIG. 5 is a table for showing an example of a data structure of the knowledge base 232 in the second embodiment.

The knowledge base 232 stores records each including an action ID 501, an action 502, a time and date 503, and an effect 504. One record corresponds to one action. Those fields included in one record are described as an example, and fields included in one record are not limited to this example. For example, each record may further include a field for storing the number of times of the application of the action.

The action ID 501 is a field for storing identification information on an action. The action 502 is a field for storing information on the generated action.

The time and date 503 is a field for storing a time and date of the application of the action. In a case where the data on the action is transmitted to the business operation system a plurality of times, the last time and date of transmission are assumed to be stored in the time and date 503.

The effect 504 stores an evaluation result of the action. In the second embodiment, any one of "effective" and "ineffective" is stored in the effect 504. "Effective" indicates that the action is effective. "Ineffective" indicates that the action is ineffective. The effect 504 may also store a numerical value indicating a degree of effect.

A description is now given of specific data processing. First, a description is given of the awareness feature calculation processing.

In Step S12, the analysis module 221 converts the business data to data shown in FIG. 6A.

A description is now given of the data generated through the conversion of the business data. FIG. 6A and FIG. 6B are tables for showing examples of a data structure of data generated through the conversion of the business data by the data analysis system 110 according to the second embodiment.

FIG. 6A is a table for showing aggregated data 600-1, which has been generated through aggregation of business data acquired before a business based on an action is carried out. FIG. 6B is a table for showing aggregated data 600-2, which has been generated through aggregation of business data acquired after the business based on the action is carried out.

The aggregated data 600-1 and 600-2 store records each including a customer ID 601, an age group 602, a gender 603, an aggregation period 604, a purchased article 605, a purchase amount 606, and a use of coupon 607. One record exists for each customer. Those fields included in one record are described as an example, and fields included in one record are not limited to this example.

The customer ID 601 is a field for storing identification information on a user of the business operation system 100 configured to carry out the business of selling the articles. The age group 602 and the gender 603 are fields for storing an age group and the gender of the user, respectively.

The aggregation period 604 is a field for storing a period of aggregation of the aggregated data. In the second embodiment, business data for each one month is aggregated for each customer, and the aggregated business data is registered in one record.

The purchased article 605 and the purchase amount 606 are fields for storing an article purchased by the user, and a price of the article, respectively. The use of coupon 607 is a field for storing details of a coupon used by the user.

One record includes rows relating to purchase of articles by the user in one month. In other words, the one record includes at least one row including the purchased article 605, the purchase amount 606, and the use of coupon 607.

The description now returns to the awareness feature calculation processing.

In Step S13, the analysis module 221 calculates a distribution of the purchase amount 606. For example, a distribution of numbers of records whose purchase amounts 606 are included in respective ranges of the purchase amount is conceivable.

In Step S14, the analysis module 221 identifies records whose purchase amounts 606 are larger than a threshold value as target data.

In Step S15, the analysis module 221 analyzes attribute values included in the records to calculate an attribute value group common to users having the purchase amount larger than the threshold value as an awareness feature.

For example, in a case where a large number of records in which the age group 602 is "30s", the gender 603 is "male", and the purchased article 605 is "foods" are included in the records identified as the target data, the analysis module 221 calculates an attribute group including "30s", "male", and "foods" as the awareness feature. A plurality of awareness features may be identified. For example, an attribute value group including "40s", "female", and "sundries" may be calculated as an awareness feature.

A description is now given of the action generation processing.

In Step S21, the action generation module 222 selects one attribute value group out of the list of the attribute value groups, and generates an action based on the selected attribute value group. The action generation module 222 carries out the same processing for all the attribute value groups included in the list of the attribute value groups.

The second embodiment is not limited by a method of generating an action. As the action to be generated, an action (enhancement action) of taking an improvement action for the users identified by the selected attribute value group and an action (extension action) of taking an improvement action for users identified by an attribute value group similar to the selected attribute value group are conceivable.

For example, in a case where the attribute value group includes "30s", "male", and "foods", the action generation module 222 generates an enhancement action of "recommending foods to males in 30s", and generates an extension action of "delivering a coupon for discounting foods at 5% to males in 20s".

A description is now given of the action evaluation processing.

In Step S42, the evaluation module 223 converts the business data acquired after the business based on the action has been carried out to aggregated data 600-2 shown in FIG. 6B, and calculates the distribution of the purchase amount 606 as in Step S11 to Step S13. The evaluation module 223 determines the effectiveness of the action based on the purchase amounts of users for whom the business based on the action has been carried out and the purchase amounts of users for whom the business based on the action has not been carried out. For example, in a case where a difference between the purchase amounts of the respective groups is larger than a threshold value, the evaluation module 223 determines that the action is effective.

The aggregated data 600-1 may be used in this case. For example, in a case where the purchase amounts of the users for whom the business based on the action has been carried out increase, and the purchase amounts of the users for whom the business based on the action has not been carried out do not change, the evaluation module 223 determines that the action is effective.

The determination method described above is an example, and the determination method is not limited to this example.

In Step S43, the evaluation module 223 adds a record to the knowledge base 232, sets the identification information in the action ID 501 of the added record, and sets the information on the selected action in the action 502. The evaluation module 223 sets a time and date of the transmission of the action list and the like in the time and date 503 of the added record, and sets the determination result in the effect 504. The action generation module 222 may also store the awareness features used to generate the actions in the knowledge base 232.

According to the second embodiment, the total sales can be increased and a reduction in the total sales can be suppressed as a result of the operation of the business operation system 100.

Third Embodiment

In the third embodiment, a description is given of specific data processing while the business operation system 100 configured to carry out a delivery business is exemplified. It is assumed that a plurality of delivery businesses are carried out in the business operation system 100. It is also assumed that a total operation period of each of the delivery businesses is set as the business evaluation indicator.

A description is now given of specific data processing. First, a description is given of the awareness feature calculation processing.

In Step S12, the analysis module 221 converts the business data to data shown in FIG. 7.

A description is now given of the data generated through the conversion of the business data. FIG. 7 is a table for showing an example of a data structure of data generated through the conversion of the business data by the data analysis system 110 according to the third embodiment.

FIG. 7 is a table for showing aggregated data 700, which has been generated through aggregation of the business data relating to one delivery business. One piece of aggregated data 700 is generated for one delivery business.

The aggregated data 700 stores records each including an operation ID 701, an assigned order 702, an operation subject 703, an operation start time point 704, and an operation period 705. One record exists for each operation. Those fields included in one record are described as an example, and fields included in one record are not limited to this example.

The operation ID 701 is a field for storing identification information on the operation. The assigned order 702 is a field for storing a number indicating an order of execution of the operation. The operation subject 703 is a field for storing information on a subject of the operation. For example, a name of or identification information on an article is stored in the operation subject 703. The operation start time point 704 is a field for storing a time point at which the operation was started. The operation period 705 is a field for storing a period during which the operation was being carried out. In the third embodiment, the operation period 705 is treated as a relevant indicator indicating a relationship among operations.

In a case where the business data does not include the operation period, a difference between the operation start time points included in the respective records of the business data is calculated as the operation period.

The description now returns to the awareness feature calculation processing.

In Step S13, the analysis module 221 calculates a distribution of the operation period 705. For example, a distribution of numbers of records whose operation periods 705 are included in respective ranges of the operation period is conceivable.

In Step S14, the analysis module 221 identifies a combination of operations whose operation periods 705 are shorter than a threshold value as target data.

In Step S15, the analysis module 221 carries out statistical processing using the target data, and calculates combinations of operations satisfying a condition as awareness features. For example, the analysis module 221 calculates an average value or the like of the operation periods 705 from target data identified from a plurality of pieces of aggregated data 700, and calculates combinations of operations each having the average value or the like less than a threshold value as the awareness features.

A description is now given of the action generation processing.

In Step S21, the action generation module 222 changes the assigned orders 702 of the operations so that as many combinations of the operations registered in the list of the awareness features as possible are included, to thereby generate an execution schedule of the operations as an action. There may be a plurality of execution schedules of the operations having the shortest total operation period. The action generation module 222 temporarily holds the calculated total operation period as a predicted total operation period. The predicted total operation period is managed in association with the identification information on the action.

The action generation module 222 may carry out processing of correcting an execution schedule of operations input from the outside. Specifically, the action generation module 222 receives an execution schedule of operations generated by a scheduler or a user, and refers to the list of the awareness features to correct the execution schedule of the operation.

A description is now given of the action evaluation processing.

In Step S42, the evaluation module 223 converts the business data acquired after the business based on the action has been carried out to the aggregated data 700 shown in FIG. 7 as in Step S11 to Step S12. In a case where a difference between an actual total operation period based on the schedule of the operations transmitted as the action and a predicted total operation period calculated in Step S21 is shorter than a threshold value, the evaluation module 223 determines that the action is effective.

The aggregated data 700 generated from the business data before the business based on the action is carried out may be used. For example, in a case where the difference between the total operation periods before and after the execution of the business based on the action is shorter than the threshold value, the evaluation module 223 determines that the action is effective.

The determination method described above is an example, and the determination method is not limited to this example.

In Step S43, the evaluation module 223 adds a record to the knowledge base 232, sets the identification information in the action ID 501 of the added record, and sets the information on the selected action in the action 502. The evaluation module 223 sets a time and date of the transmission of the action list and the like in the time and date 503 of the added record, and sets the determination result in the effect 504. The action generation module 222 may also store the awareness features used to generate the actions in the knowledge base 232.

According to the third embodiment, the total operation period can be reduced and an increase in total operation period can be suppressed as a result of the operation of the business operation system 100.

Modification Example of Third Embodiment

In a modification example of the third embodiment, a sequence of three or more operations is calculated as an awareness feature. A description is now given of the modification example while focusing on a difference from the third embodiment.

In the modification example of the third embodiment, the awareness feature calculation processing is partially different.

In Step S12, the analysis module 221 converts the business data to data shown in FIG. 8.

A description is now given of the data generated through the conversion of the business data. FIG. 8 is a table for showing an example of a data structure of the data generated through the conversion of the business data by the data analysis system 110 according to the modification example of the third embodiment.

FIG. 8 is a table for showing aggregated data 800, which has been generated through aggregation of the business data relating to one delivery business. One piece of aggregated data 800 is generated for one delivery business.

The aggregated data 800 stores records each including an operation ID 801, an assigned order 802, an operation subject 803, an operation start time point 804, and a sequence 805. One record exists for each operation. Those fields are described as an example, and fields included in one record are not limited to this example.

An operation ID 801, an assigned order 802, an operation subject 803, and an operation start time point 804 are the same fields as the operation ID 701, the assigned order 702, the operation subject 703, and the operation start time point 704, respectively.

The sequence 805 is a field for storing a sequence of operation subjects before and after the own record, namely, a sequence of operations. For example, in a case where the operation ID 801 is "0002", the operation subject 803 of a record before the own record is "article A", the operation subject 803 of the own record is "article B", the operation subject 803 of a record after the own record is "article A", and thus "ABA" is stored in the sequence 805.

In a case where a record does not exist before or after the own record, only the operation subject of the own record and the operation subject after the own record or before the own record are stored in the sequence 805.

The description now returns to the awareness feature calculation processing.

In Step S13, the analysis module 221 calculates a distribution of the total operation periods of respective pieces of the aggregated data 800. For example, a distribution of numbers of operation schedules whose calculated total operation periods are included in respective time widths is conceivable.

In Step S14, the analysis module 221 identifies pieces of aggregated data 800 corresponding to operation schedules having the total operation period shorter than a threshold value as the target data.

In Step S15, the analysis module 221 carries out statistical processing using the aggregated data 800, and calculates sequences of operations common to the operation schedules having the shorter total operation period as the awareness feature. For example, the analysis module 221 refers to the sequences 805 of the plurality of pieces of aggregated data 800 to calculate the number of occurrences of each sequence of the operations, and calculates sequences of operations each having the number of occurrences larger than a threshold value as the awareness features.

For example, in a case where the number of occurrences of each of the sequences "BBA" and "AAC" is determined to be larger than the threshold value as a result of the analysis of the information on the aggregated data 800 corresponding to delivery businesses each having a total operation period shorter than 30 minutes, the analysis module 221 calculates "BBA" and "AAC" as the awareness features.

In the modification example of the third embodiment, the action generation processing is partially different.

In Step S21, the action generation module 222 changes the assigned orders 702 of the operations so that as many sequences of the operations registered in the list of the awareness features as possible are included, to thereby generate an execution schedule of the operations as an action.

Processing and action evaluation processing to be carried out by the business operation system 100 are the same. The action generation module 222 may also store the awareness features used to generate the actions in the knowledge base 232.

Fourth Embodiment

In the fourth embodiment, an action is generated based on a criterion of excluding actions. A description is now given of the fourth embodiment while focusing on the difference from the first embodiment.

The computer 200 in the fourth embodiment holds constraint information for defining information on actions to be excluded. As a method of holding the constraint information, a method of storing the constraint information in the knowledge base 232 and a method of holding the constraint information independently of the knowledge base 232 are conceivable.

First, a description is given of an example in which the constraint information is registered in the knowledge base 232. In this case, data indicating actions to be excluded is conceivable as the constraint information.

For example, a record in which "recommendation of alcoholic beverages to a person in 10s" is set in the action 502 and "inhibited" is set in the effect 504 is stored in the knowledge 232 in the fourth embodiment as restraint information. "Inhibited" is a value indicating that the generation of the action set in the action 502 is inhibited.

Such a record as described above may be set by an operator of the business operation system 100 or the like, or may be generated by the data analysis system 110. As the method of generation by the data analysis system 110, for example, the data analysis system 110 may calculate data that degrades the business evaluation indicator and also extends the distribution of the relevant indicator, and use such data to generate an action.

In the fourth embodiment, the action generation processing is partially different. Specifically, in Step S21, the action generation module 222 selects one awareness feature from the list of the awareness features, and generates an action based on the selected awareness feature. The action generation module 222 refers to the knowledge base 232 to determine whether or not the generated action is inhibited from being generated. In a case where the action is not inhibited from being generated, the action generation module 222 registers data on the generated action in the action list.

A description is now given of an example in which the restraint information is held independently of the knowledge base 232. In this case, restraint information that stores information in the same form as the constraint information registered in the knowledge base 232 and restraint information that indicates an awareness feature to be excluded are conceivable.

In the case of the constraint information that stores the awareness feature to be excluded, the awareness feature calculation processing is partially different. Specifically, in Step S15, the analysis module 221 refers to the constraint information to determine whether or not the calculated awareness feature is the awareness feature to be excluded. In a case where the calculated awareness feature is not the awareness feature to be excluded, the analysis module 221 registers the awareness feature in the list of the awareness features.

According to the fourth embodiment, execution of a business based on an action that may cause inconsistency can be prevented in advance. Moreover, a search range for calculating an awareness feature can be reduced through use of the constraint information, and thus a calculation cost can be reduced.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A data analysis system, which is configured to generate an action for controlling a business to be carried out by a business operation system, the data analysis system comprising at least one computer including:

an arithmetic device;
a storage device coupled to the arithmetic device; and
an interface, which is coupled to the arithmetic device, and is to be used for communication to and from the business operation system,
wherein the arithmetic device is configured to:
obtain business data including a plurality of attributes relating to the business from the business operation system via the interface;
convert the business data to converted business data by aggregating the business data using predetermined criteria;
calculate a distribution of a relevant indicator, which is one of: a value of one of the plurality of attributes; and a value calculated based on the value of the one of the plurality of attributes, and relates to a business evaluation indicator to be used to evaluate the business;
identify target data within the distribution of the relevant indicator during a predetermined time period;
analyze the target data, to thereby calculate a plurality of awareness features which contribute to the improvement of a business evaluation indicator by causing the business evaluation indicator to approach a target value, the awareness features being determined based on a plurality of groupings of attributes relevant to the target data;
generate an action for improving the business evaluation indicator based on a selected one of the awareness features;
obtain the business data from the business operation system after a business based on the generated action is carried out;
carry out action evaluation processing for evaluating effectiveness of the generated action based on the generated action and the business data;
store data on the generated action and a result of the action evaluation processing in the storage device as a knowledge base in association with each other; and
generate another action for improving the business evaluation indicator based on another selected one of the awareness features and the knowledge base,
wherein the target data is selected for a plurality of operations whose operation periods are less than a threshold,
wherein the target data is analyzed to calculate the plurality of awareness features based on the plurality of groupings of attributes relevant to the target data by carrying out statistical processing using the target data and calculating combinations of operations satisfying predetermined conditions as the awareness features,
wherein the arithmetic device is configured generate the another action for improving the business evaluation indicator based on the another selected one of the awareness features by applying the another action to a different grouping of attributes than the grouping of attributes corresponding to the selected one of the awareness features, and
wherein the steps of analyzing the target data, generating the action, obtaining the business data, carrying out action evaluation processing, storing data on the generated action and a result of the action evaluation processing and generating another action for improving the business evaluation indicator are automatically performed repeatedly to accumulate the data in the knowledge base.

2. The data analysis system according to claim 1, wherein the arithmetic device is configured to:

identify the converted business data corresponding to a specific range of the distribution of the relevant indicator as the target data;
analyze values of the plurality of attributes included in the converted business data identified as the target data, to thereby calculate a combination of the values of the plurality of attributes as the selected awareness feature; and
change a value of at least one of the plurality of attributes included in the combination of the values of the plurality of attributes calculated as the selected awareness feature, to thereby generate the action for improving the business evaluation indicator.

3. The data analysis system according to claim 1,
wherein the business operation system is configured to carry out a business including a plurality of operations, and
wherein the arithmetic device is configured to:
identify one of a sequence and a combination of operations forming an execution order of the plurality of operations as the target data based on the distribution of the relevant indicator indicating a relationship among the plurality of operations;
analyze the target data, to thereby calculate one of a sequence and a combination of operations that are likely to contribute to the improvement of the business evaluation indicator as the selected awareness feature; and
generate an execution schedule of the plurality of operations as the action for improving the business evaluation indicator based on one of the sequence and the combination of operations calculated as the selected awareness feature.

4. The data analysis system according to claim 1,
wherein the storage device is configured to store constraint information for managing information on an action to be excluded, and
wherein the arithmetic device is configured to determine whether the generated action is the action to be excluded based on the constraint information.

5. The data analysis system according to claim 1,
wherein the arithmetic device is configured to carry out the evaluation processing by comparing the business data before and after the action is carried out for the selected awareness feature with business data before and after the action is carried out with respect to business data for which the action was not carried out.

6. The data analysis system according to claim 1,
wherein the plurality of awareness features that are calculated by analyzing the target data are different from explanatory variables, which are causes of certain responses and are identified based on correlations obtained from a result of analysis of all business data.

7. A method of generating, by a data analysis system, an action for controlling a business to be carried out by a business operation system,
the data analysis system including at least one computer including:
an arithmetic device;
a storage device coupled to the arithmetic device; and
an interface, which is coupled to the arithmetic device, and is to be used for communication to and from the business operation system,
the method comprising the steps of:

obtaining, by the arithmetic device, business data including a plurality of attributes, which are parameters relating to the business, from the business operation system via the interface;

converting the business data to converted business data by aggregating the business data using predetermined criteria;

calculating a distribution of a relevant indicator, which is one of: a value of one of the plurality of attributes; and a value calculated based on the value of the one of the plurality of attributes, and relates to a business evaluation indicator to be used to evaluate the business;

identifying, by the arithmetic device, target data within the distribution of the relevant indicator during a predetermined time period;

analyzing, by the arithmetic device, the target data, to thereby calculate a plurality of awareness features which contribute to the improvement of a business evaluation indicator by causing the business evaluation indicator to approach a target value, the awareness features being determined based on a plurality of groupings of attributes relevant to the target data;

generating, by the arithmetic device, an action for improving the business evaluation indicator based on a selected one of the awareness features; and outputting, by the arithmetic device, data on the generated action via the interface;

obtaining, by the arithmetic device, the business data from the business operation system after a business based on the generated action is carried out;

carrying out, by the arithmetic device, action evaluation processing for evaluating effectiveness of the generated action based on the generated action and the business data; and storing, by the arithmetic device, data on the generated action and a result of the action evaluation processing in the storage device as a knowledge base in association with each other, generating, by the arithmetic device, another action for improving the business evaluation indicator based on another selected one of the awareness features and the knowledge base, wherein the target data is selected for a plurality of operations whose operation periods are less than a threshold, wherein the target data is analyzed to calculate the plurality of awareness features based on the plurality of groupings of attributes relevant to the target data by carrying out statistical processing using the target data and calculating combinations of operations satisfying predetermined conditions as the awareness features, wherein the arithmetic device is configured generate the another action for improving the business evaluation indicator based on the another selected one of the awareness features by applying the another action to a different grouping of attributes than the grouping of attributes corresponding to the selected one of the awareness features, and wherein the steps of analyzing the target data, generating the action, obtaining the business data, carrying out action evaluation processing, storing data on the generated action and a result of the action evaluation processing and generating another action for improving the business evaluation indicator are automatically performed repeatedly to accumulate the data in the knowledge base.

8. The method of generating an action according to claim 7, wherein the identifying step includes identifying, by the arithmetic device, converted business data corresponding to a specific range of the distribution of the relevant indicator as the target data, wherein the analyzing step includes analyzing, by the arithmetic device, values of the plurality of attributes included in the converted business data identified as the target data, to thereby calculate a combination of the values of the plurality of attributes as the selected awareness feature, and wherein the generating step includes changing, by the arithmetic device, a value of at least one of the plurality of attributes included in the combination of the values of the plurality of attributes calculated as the selected awareness feature, to thereby generate the action for improving the business evaluation indicator.

9. The method of generating an action according to claim 7, wherein the business operation system is configured to carry out a business including a plurality of operations, wherein the identifying step includes identifying, by the arithmetic device, one of a sequence and a combination of operations forming an execution order of the plurality of operations as the target data based on the distribution of the relevant indicator indicating a relationship among the plurality of operations, wherein the analying step includes analyzing, by the arithmetic device, the target data, to thereby calculate one of a sequence and a combination of operations that are likely to contribute to the improvement of the business evaluation indicator as the selected awareness feature, and wherein the generating step includes generating, by the arithmetic device, an execution schedule of the plurality of operations as the action for improving the business evaluation indicator based on one of the sequence and the combination of operations calculated as the selected awareness feature.

10. The generation method for the action according to claim 7, wherein the storage device is configured to store constraint information for managing information on an action to be excluded, and wherein the generating step includes determining, by the arithmetic device, whether the generated action is the action to be excluded based on the constraint information.

* * * * *